US012496891B2

(12) United States Patent
Imashioya et al.

(10) Patent No.: US 12,496,891 B2
(45) Date of Patent: Dec. 16, 2025

(54) BATTERY CASE

(71) Applicant: Nissan Motor Co., Ltd., Yokohama (JP)

(72) Inventors: Tatsuya Imashioya, Kanagawa (JP); Yuuji Okamoto, Kanagawa (JP); Shinya Akizuki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 286 days.

(21) Appl. No.: 18/563,641

(22) PCT Filed: May 27, 2021

(86) PCT No.: PCT/JP2021/020275
§ 371 (c)(1),
(2) Date: Nov. 22, 2023

(87) PCT Pub. No.: WO2022/249409
PCT Pub. Date: Dec. 1, 2022

(65) Prior Publication Data
US 2024/0286477 A1   Aug. 29, 2024

(51) Int. Cl.
*B60K 1/04* (2019.01)
*B60L 50/64* (2019.01)
(Continued)

(52) U.S. Cl.
CPC ............... *B60K 1/04* (2013.01); *B60L 50/64* (2019.02); *H01M 50/202* (2021.01);
(Continued)

(58) Field of Classification Search
CPC .. B60K 1/04; B60K 2001/0438; B60K 11/02; B60K 2001/006; B60L 50/64;
(Continued)

(56) References Cited

U.S. PATENT DOCUMENTS

| 4,365,681 A | * | 12/1982 | Singh | B60L 50/64 |
| | | | | 180/68.5 |
| 2015/0174996 A1 | * | 6/2015 | Ikeda | H01M 8/2465 |
| | | | | 180/68.5 |
| 2018/0237075 A1 | * | 8/2018 | Kawabe | B60L 50/66 |

FOREIGN PATENT DOCUMENTS

| CN | 102714287 A | * | 10/2012 | .......... H01M 50/227 |
| CN | 102729791 A | * | 10/2012 | .......... H01M 50/249 |

(Continued)

*Primary Examiner* — Hung Q Nguyen
(74) *Attorney, Agent, or Firm* — Young Basile Hanlon & MacFarlane, P.C.

(57) ABSTRACT

A battery case that accommodates a battery for an electric vehicle includes a pair of side frames that constitute left and right side walls of the battery case in a vehicle width direction and extend along a vehicle front-rear direction, a cross member that partitions an internal space of the battery case in the vehicle front-rear direction and extends from one of the side frames to the other side frame, and a side bracket that is fixed to an outer surface of the side frame and is configured to attach the battery case to a vehicle body. The side frame includes a frame rib extending in the vehicle width direction inside the side frame and the side bracket includes a bracket rib extending in the vehicle width direction inside the side bracket.

7 Claims, 5 Drawing Sheets

(51) Int. Cl.
*H01M 50/202* (2021.01)
*H01M 50/249* (2021.01)

(52) U.S. Cl.
CPC ... *H01M 50/249* (2021.01); *B60K 2001/0438* (2013.01); *H01M 2220/20* (2013.01)

(58) Field of Classification Search
CPC ............ H01M 50/202; H01M 50/249; H01M 2220/20; B60Y 2306/01
See application file for complete search history.

(56) References Cited

FOREIGN PATENT DOCUMENTS

| | | | | | |
|---|---|---|---|---|---|
| CN | 104443039 | A | * | 3/2015 | ............... B60K 1/04 |
| CN | 104859717 | A | * | 8/2015 | ............. B62D 21/02 |
| CN | 109562790 | A | * | 4/2019 | ........... B62D 29/008 |
| DE | 102012213308 | A1 | * | 9/2013 | .......... H01M 50/204 |
| EP | 2070754 | A1 | * | 6/2009 | ............... B60L 58/26 |
| EP | 2332761 | A1 | * | 6/2011 | .......... H01M 50/227 |
| JP | H9-109692 | A | | 4/1997 | |
| JP | 2936959 | B2 | | 8/1999 | |
| KR | 20120104376 | A | * | 9/2013 | ............... B60K 1/04 |
| WO | 2021/070288 | A1 | | 4/2021 | |

\* cited by examiner

BATTERY CASE

TECHNICAL FIELD

The present invention relates to a battery case.

BACKGROUND ART

JP 2936959 B discloses an electric vehicle equipped with a battery as a drive source.

In JP 2936959 B, there is provided a battery case formed by a center frame and side frames extending in a vehicle front-rear direction, a front frame disposed on a vehicle front side, a rear frame disposed on a vehicle rear side, and cross members performing partition in a vehicle width direction. The battery is disposed in a placement portion formed by arranging the frames and the members in a grid pattern. Further, the battery case is provided with a side sill outside the side frame in a width direction of a vehicle body.

SUMMARY OF INVENTION

Since the electric vehicle described in JP 2936959 B has the above-described configuration, for example, even when a load is input from a side surface of the vehicle, the load does not directly act on the battery. On the other hand, a further improvement in durability against the load input to the side surface of the electric vehicle is desired.

An object of the present invention is to provide a technique for improving durability against a load input to a side surface of an electric vehicle.

According to one aspect of the present invention, a battery case that accommodates a battery for an electric vehicle is provided.

The battery case includes a pair of side frames, a cross member, and a side bracket. The pair of side frames constitute left and right side walls of the battery case in a vehicle width direction and extend along a vehicle front-rear direction. The cross member partitions an internal space of the battery case in the vehicle front-rear direction and extends from one of the side frames to the other side frame. The side bracket is fixed to an outer surface of the side frame and is configured to attach the battery case to a vehicle body. The side frame includes a frame rib extending in the vehicle width direction inside the side frame and the side bracket includes a bracket rib extending in the vehicle width direction inside the side bracket.

DESCRIPTION OF EMBODIMENTS

Hereinafter, embodiments according to the present invention will be described with reference to the drawings.

First Embodiment

Figure 1:
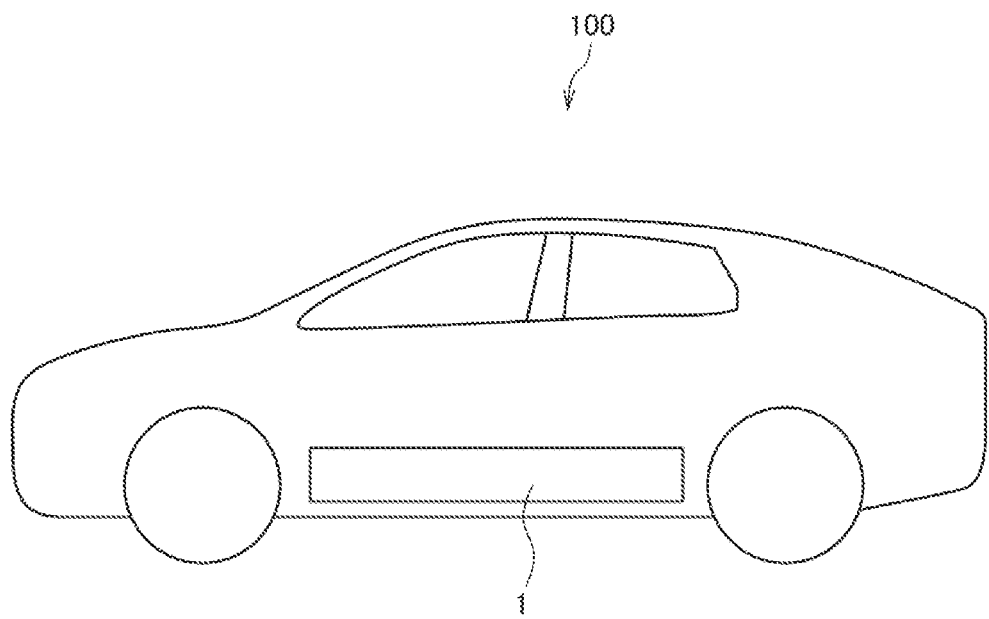
FIG. 1 is a side perspective view showing a main part of an electric vehicle on which a battery case according to an embodiment of the present invention is mounted.
Figure 2:
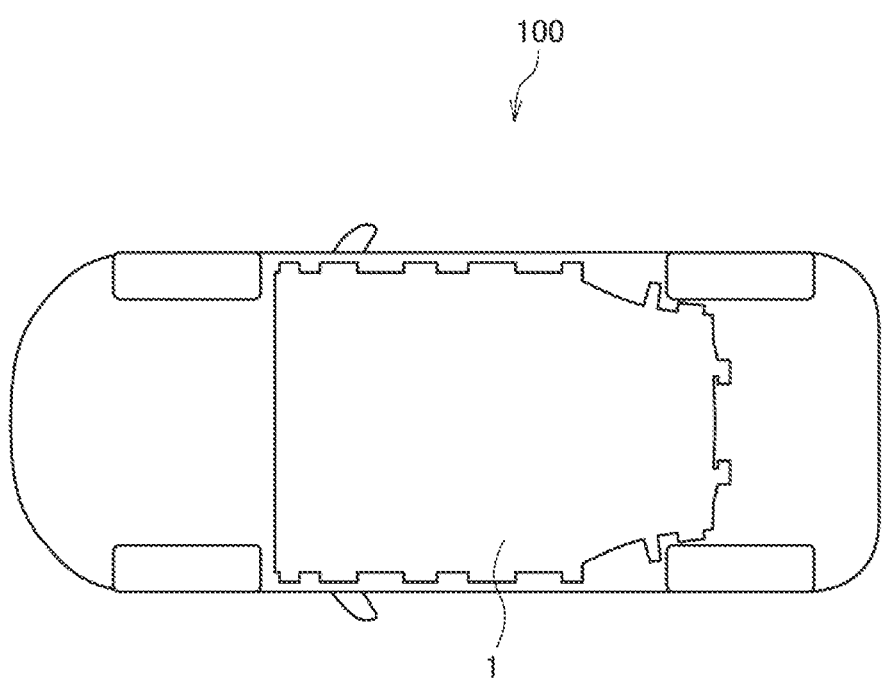
FIG. 2 is a perspective plan view of the main part of the electric vehicle on which the battery case according to the embodiment of the present invention is mounted, as viewed from a bottom side.

FIG. 1 is a side perspective view showing a main part of an electric vehicle 100 on which a battery case 1 according to an embodiment of the present invention is mounted. FIG. 2 is a perspective plan view of the main part of the electric vehicle 100 viewed from a bottom side.

As shown in FIGS. 1 and 2, the battery case 1 accommodates a battery used as a drive source of the electric vehicle 100 (hereinafter, referred to as a vehicle 100). The battery case 1 is disposed below a floor of the vehicle 100 over a region corresponding to the floor of the vehicle 100.

Figure 3:
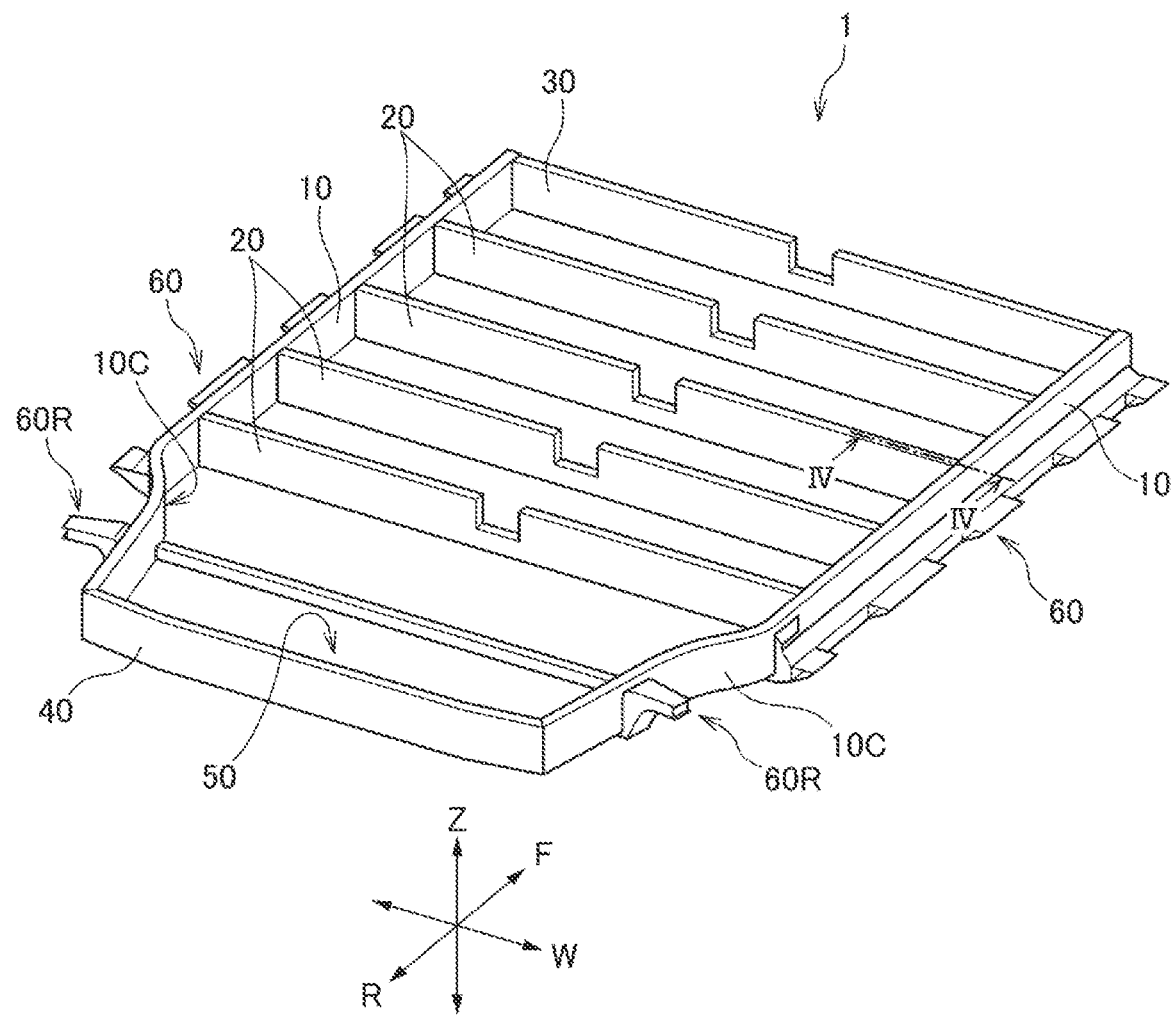
FIG. 3 is a perspective view illustrating the battery case according to a first embodiment of the present invention.

FIG. 3 is a perspective view illustrating the battery case 1. In FIG. 3, arrows representing a vehicle front direction F and a vehicle rear direction R, an arrow representing a vehicle width direction W, and an arrow representing a vehicle upper-lower direction Z are described. The vehicle front-rear direction, the vehicle width direction, and the vehicle upper-lower direction may be referred to as a front-rear direction FR, a width direction W, and an upper-lower direction Z, respectively.

As shown in FIG. 3, the battery case 1 includes side frames 10, cross members 20, a front frame 30, a rear frame 40, and a bottom plate 50.

A pair of side frames 10 are provided at a predetermined interval in the vehicle width direction W, and constitute left and right side walls of the battery case 1. Further, the side frame 10 extends along the front-rear direction FR of the vehicle 100.

The front frame 30 constitutes a front side wall in the vehicle front-rear direction FR, and the rear frame 40 constitutes a rear side wall in the vehicle front-rear direction FR. Further, the bottom plate 50 constitutes a case bottom surface that functions as a battery placement surface in the battery case 1.

The side frames 10, the front frame 30, and the rear frame 40 are provided upright with respect to a peripheral edge of the bottom plate 50, and are joined by welding, thereby constituting a box-shaped case. Further, an internal space formed by the side frames 10, the front frame 30, and the rear frame 40 is partitioned by a plurality of cross members 20.

Each of the cross members 20 partitions the internal space of the battery case 1 in the front-rear direction FR, and extends from one side frame 10 to the other side frame 10. In the first embodiment, the battery case 1 includes four cross members 20.

Although not shown in FIG. 3, the battery is accommodated in each of a plurality of sections formed by the cross members 20 in the internal space of the battery case 1. A plurality of battery modules constitute one battery (battery pack). The battery case 1 is covered with a case cover (not shown) in a state in which the battery module formed by a lithium ion battery or the like is accommodated in the internal space.

As described above, the battery case 1 in which the battery is accommodated includes side brackets 60 and rear side brackets 60R on an outer side in a vehicle body width direction of the side frame 10, and is attached to a vehicle body of the vehicle 100 by the side brackets 60 and the rear side brackets 60R.

From the viewpoint of increasing a load of the battery as the drive source, as shown in FIG. 2, the battery case 1 is formed by maximally using a floor region of the vehicle 100. Therefore, in the width direction W of the vehicle 100, a space between the battery case 1 and the vehicle body of the vehicle 100 is reduced. Therefore, the battery case 1 is required to have sufficient durability against a load input to the vehicle 100 particularly due to a collision or the like from a side among an impact that may be input to the vehicle 100.

Figure 4:
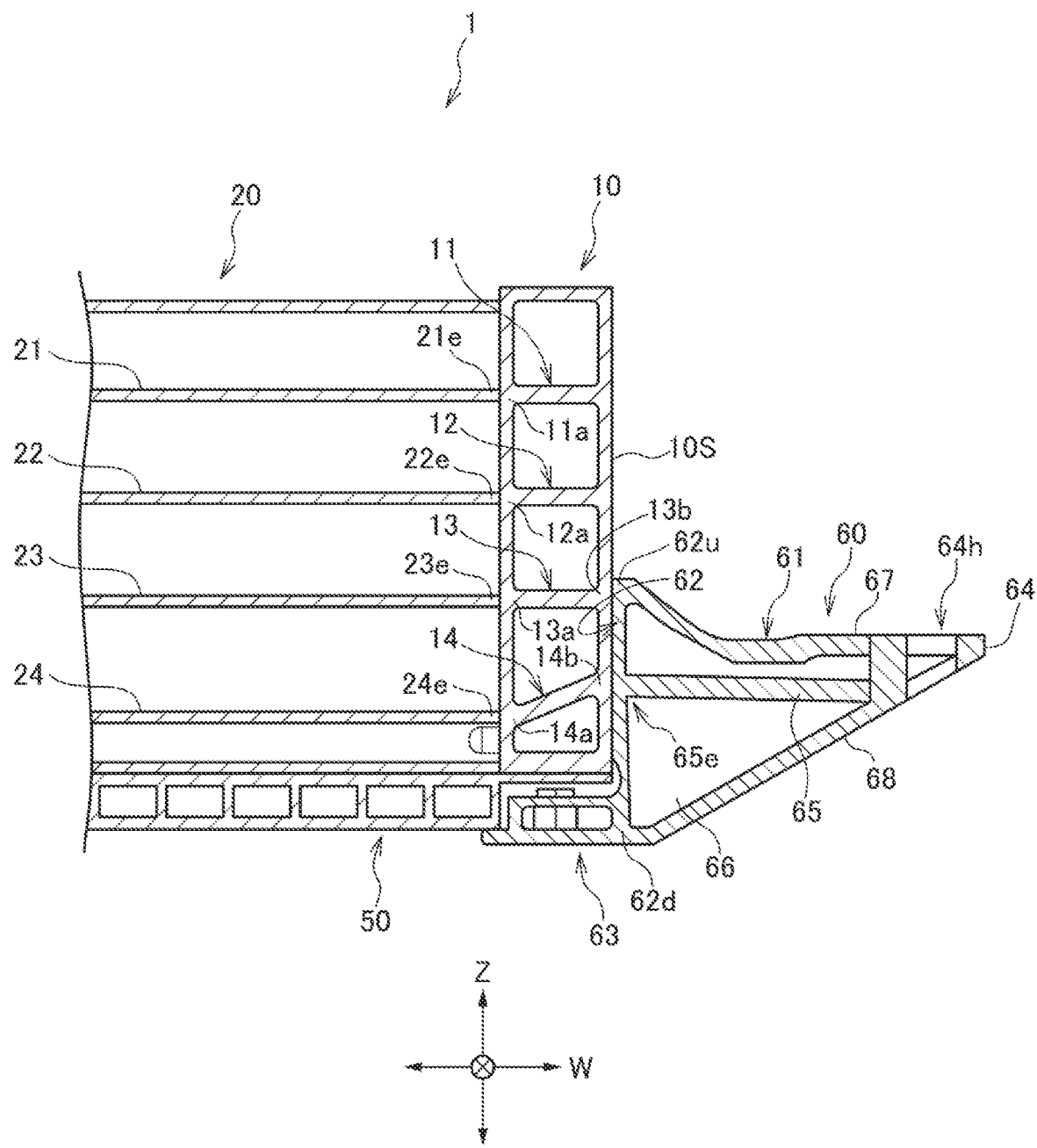
FIG. 4 is a cross-sectional view taken along a line IV-IV in FIG. 3.

FIG. 4 is a cross-sectional view taken along a line IV-IV in FIG. 3. As shown in FIG. 4, the side bracket 60 is fixed to an outer surface 10S of each of the side frames 10 that form the left and right walls of the internal space of the battery case 1 by welding or the like.

The side frame 10 is a hollow plate-shaped member and includes a frame rib 11 extending in the width direction W inside the side frame 10. In the present embodiment, the side frame 10 includes four frame ribs, that is, frame ribs 11, 12, 13, and 14 that partition an inside of the side frame 10 in the upper-lower direction Z.

Strength of the side frame 10 in the width direction W is increased by the frame ribs 11, 12, 13, and 14 extending in the width direction W inside the side frame 10.

Next, the side bracket 60 fixed to an outside of the side frame 10 will be described. The side bracket 60 includes a main body portion 61 that attaches the battery case 1 to the vehicle body, an abutting portion 62 that constitutes one surface of the main body portion 61 on a side frame 10 side and abuts against the outer surface 10S of the side frame 10, and a support portion 63 that protrudes from a lower end 62d of the abutting portion 62 and supports the battery case 1 from below. The abutting portion 62 is fixed to the outer surface 10S and the support portion 63 is fixed to the bottom plate 50 of the battery case 1 by welding or the like.

The main body portion 61 includes a protruding end portion 64 that protrudes from the abutting portion 62 toward an outside of the vehicle in the width direction W of the battery case 1. A hole 64h that penetrates in the upper-lower direction Z is formed in the protruding end portion 64, and the side bracket 60 and the vehicle 100 are fixed by a bolt that pass through the hole 64h.

The side bracket 60 is a hollow rod-shaped member, and includes a bracket rib 65 extending in the width direction W inside the side bracket 60. In this way, strength of the side bracket 60 in the width direction W is increased by the bracket rib 65 extending in the width direction W inside the side bracket 60.

The rear side bracket 60R will be described in conjunction with a second embodiment of the side bracket 60.

Next, the cross member 20 disposed between the pair of side frames 10 will be described. The cross member 20 is a hollow plate-shaped member and includes a member rib 21 extending in the width direction W inside the cross member 20. In the present embodiment, the cross member 20 includes four member ribs, that is, member ribs 21, 22, 23, and 24 that partition an interior of the cross member 20 in the upper-lower direction Z. Thus, strength of the cross member 20 in the width direction W is increased by the member ribs 21, 22, 23, and 24 extending in the width direction W inside the cross member 20.

In the present embodiment, as shown in FIG. 4, an end portion 65e of the bracket rib 65 on the side frame 10 side and an end portion 14b of the frame rib 14 on a side bracket 60 side are disposed in a manner of corresponding to each other in the upper-lower direction Z. That is, a height position in the upper-lower direction Z of the end portion 65e of the bracket rib 65 on the side frame 10 side is substantially the same as a height position in the upper-lower direction Z of the end portion 14b of the frame rib 14 on the side bracket 60 side.

Accordingly, the strength of the side frame 10 and the side bracket 60 in the width direction W is increased, and a load transmission path (hereinafter, referred to as a load path) for transmitting, from the bracket rib 65 to the frame rib 14, the load input to the side bracket 60 from the side of the vehicle 100, is formed.

As shown in FIG. 4, an end portion 11a of the frame rib 11 on a cross member 20 side and an end portion 21e of the member rib 21 on the side frame 10 side are disposed in a manner of corresponding to each other in the vehicle upper-lower direction Z. That is, a height position in the upper-lower direction Z of the end portion 11a of the frame rib 11 on the cross member 20 side is substantially the same as a height position in the upper-lower direction Z of the end portion 21e of the member rib 21 on the side frame 10 side.

Further, an end portion 12a of the frame rib 12 on the cross member 20 side and an end portion 22e of the member rib 22 on the side frame 10 side are disposed in a manner of corresponding to each other in the vehicle upper-lower direction Z. That is, a height position in the upper-lower direction Z of the end portion 12a of the frame rib 12 on the cross member 20 side is substantially the same as a height position in the upper-lower direction Z of the end portion 22e of the member rib 22 on the side frame 10 side.

Similarly, height positions in the upper-lower direction Z of an end portion 13a of the frame rib 13 and an end portion 14a of the frame rib 14 on the cross member 20 side are substantially the same as height positions in the upper-lower direction Z of an end portion 23e of the member rib 23 and an end portion 24e of the member rib 24 on the side frame 10 side, respectively.

Therefore, load paths for transmitting a load input to the frame ribs 11, 12, 13, and 14 of the side frame 10 to the member ribs 21, 22, 23, and 24 of the cross member 20 are formed.

As shown in FIG. 4, the side bracket 60 includes a main body upper surface portion 67 extending from the protruding end portion 64 to an upper end 62u of the abutting portion 62, and a main body lower surface portion 68 extending from the protruding end portion 64 to a lower end 62d of the abutting portion 62. A cross-sectional shape in the upper-lower direction Z along the width direction W is a shape that spreads in the upper-lower direction Z from the protruding end portion 64 toward a vehicle inner side in the width direction W and is continuous with the abutting portion 62.

Further, the side bracket 60 is disposed such that the upper end 62u of the abutting portion 62 and an end portion 13b of the frame rib 13 on the side bracket 60 side correspond to each other in the upper-lower direction Z. That is, a height position of the upper end 62u of the abutting portion 62 in the upper-lower direction Z and a height position of the frame rib 13 in the upper-lower direction Z are substantially the same.

Accordingly, a load path is formed in which a load input from the protruding end portion 64 of the side bracket 60 is dispersed so as to spread in the upper-lower direction Z and transmitted to the side frame 10.

The side bracket 60 has a passage 66 extending in the front-rear direction FR by partitioning an inside of the side bracket 60 by the bracket rib 65. In the present embodiment, the passage 66 is a refrigerant passage through which a refrigerant that cools an in-vehicle device such as a motor for a rear wheel provided in the vehicle 100 passes.

As shown in FIG. 3, a part of each of the pair of side frames 10 is curved such that a distance between the side frames 10 in the width direction W is gradually decreases along the front-rear direction FR so that the battery case 1 has a shape corresponding to a place where the battery case 1 can be mounted in the vehicle 100. A curved portion 10C is seamless, that is, formed seamlessly, by bending in a plurality of stages.

Effects of First Embodiment

The battery case 1 according to the first embodiment includes the pair of side frames 10 constituting the left and right side walls in the vehicle width direction W, the cross members 20 each extending from one side frame 10 to the other side frame 10, and the side brackets 60 each fixed to the outer surface 10S of the side frame 10 and attaching the battery case 1 to the vehicle body. In the battery case 1, the pair of side frames 10 constituting the left and right side walls in the vehicle width direction W are supported by the cross members 20 in the vehicle width direction W. The side frame 10 includes the frame ribs 11, 12, 13, and 14 extending in the vehicle width direction W in the side frame 10. The side frame 10 is supported in the vehicle width direction W by frame ribs 11, 12, 13, and 14 inside the side frame 10. The side bracket 60 includes the bracket rib 65 extending in the vehicle width direction W inside the side bracket 60. The side bracket 60 is supported by the bracket rib 65 in the vehicle width direction W inside the side bracket 60.

Thus, the strength of the side frame 10 and the side bracket 60 in the vehicle width direction W is increased by the frame ribs 11, 12, 13, and 14 and the bracket rib 65, and the pair of side frames 10 are supported by the cross members 20 in the vehicle width direction W. Therefore, since the strength of the battery case 1 is increased when the load is applied in the vehicle width direction W, the durability against, for example, a collision from a side surface of the vehicle 100 can be improved.

The battery case 1 is disposed such that the end portion 65e of the bracket rib 65 on the side frame 10 side and the end portion 14b of the frame rib 14 on the side bracket 60 side correspond to each other in the vehicle upper-lower direction Z. Accordingly, the load path is formed from the bracket rib 65 to the frame rib 14. Therefore, the load input to the side bracket 60 from an outer side in the vehicle width direction W can be more reliably dispersed from the side bracket 60 to the side frame 10.

Further, in the side frame 10 and the side bracket 60, a height position of the frame rib 14 in the vehicle upper-lower direction Z and a height position of the bracket rib 65 are aligned, so that rigidity of the battery case 1 in the vehicle width direction W is increased, and the load input from the side of the vehicle 100 can be smoothly transmitted in the vehicle width direction W of the battery case 1.

In the battery case 1, the cross member 20 includes the member ribs 21, 22, 23, and 24 extending in the vehicle width direction W in the cross member 20. Accordingly, since the cross member 20 is supported in the vehicle width direction W by the member ribs 21, 22, 23, 24 inside the cross member 20, the strength of the cross member 20 in the vehicle width direction W can be improved.

In the battery case 1, the height positions of the end portions 11a, 12a, 13a, and 14a of the frame ribs 11, 12, 13, and 14 on the cross member 20 side in the vehicle upper-lower direction Z are aligned with the height positions of the end portions 21e, 22e, 23e, and 24e of the member ribs 21, 22, 23, and 24 on the side frame 10 side, respectively.

Therefore, in the battery case 1, the load paths are formed from the frame ribs 11, 12, 13, and 14 to the member ribs 21, 22, 23, and 24. Accordingly, the load input to the side bracket 60 from the outer side in the vehicle width direction W can be more reliably dispersed from the side frame 10 to the cross member 20.

Further, in the side frame 10 and the side bracket 60, the height position of the frame rib 14 and the height position of the bracket rib 65 in the vehicle upper-lower direction Z are aligned, and the height positions of the end portions 11a, 12a, 13a, 14a of the frame ribs 11, 12, 13, 14 on the cross member 20 side and the height positions of the end portions 21e, 22e, 23e, 24e of the member ribs 21, 22, 23, 24 on the side frame 10 side are aligned, respectively, and thus the rigidity of the battery case 1 in the vehicle width direction W is increased, and the load input from the side of the vehicle 100 can be smoothly transmitted in the vehicle width direction W of the battery case 1.

In the battery case 1, the side bracket 60 includes the abutting portion 62 that abuts against the outer surface 10S of the side frame 10 and the support portion 63 that supports a bottom portion of the battery case 1 from below. That is, the battery case 1 is supported by the vehicle body in a manner of being embraced by the side bracket 60. Therefore, even when an excessive load is input to the side surface of the vehicle 100, it is possible to prevent joining between the side bracket 60 and the battery case 1 from being broken and the battery case 1 from falling off from the vehicle body.

In the battery case 1, the upper end 62u of the abutting portion 62 and the end portion 13b of the frame rib 13 on the side bracket 60 side are disposed in a manner of corresponding to each other in the vehicle upper-lower direction Z. Therefore, the load path is formed from the abutting portion 62 of the side bracket 60 through the frame rib 13. Accordingly, the load input from the side bracket 60 can be more reliably dispersed to the side frame 10.

In the battery case 1, the side bracket 60 has the passage 66 extending in the vehicle front-rear direction FR by partitioning the inside of the side bracket 60 by the bracket rib 65. The passage 66 is a refrigerant passage for cooling the in-vehicle device. Therefore, it is not necessary to separately form the refrigerant passage, and a layout of the vehicle 100 can be improved. Since the refrigerant passage can be formed inside the side bracket 60, the passage 66 as the refrigerant passage can be protected from the load from the outside.

In the battery case 1, each of the pair of side frames 10 includes the curved portion 10C that is curved such that the distance between the pair of side frames 10 in the width direction W gradually decreases along the front-rear direction FR. The curved portion 10C is formed by seamless processing and includes no welded portion. Therefore, the rigidity of the side frame 10 can be increased compared to a case in which the side frame 10 is formed by a combination of linear members.

As described above, according to the battery case 1 described above, the durability against the load input to the side surface of the vehicle 100 can be improved, and the accommodated battery can be more reliably protected.

Second Embodiment

Figure 5:
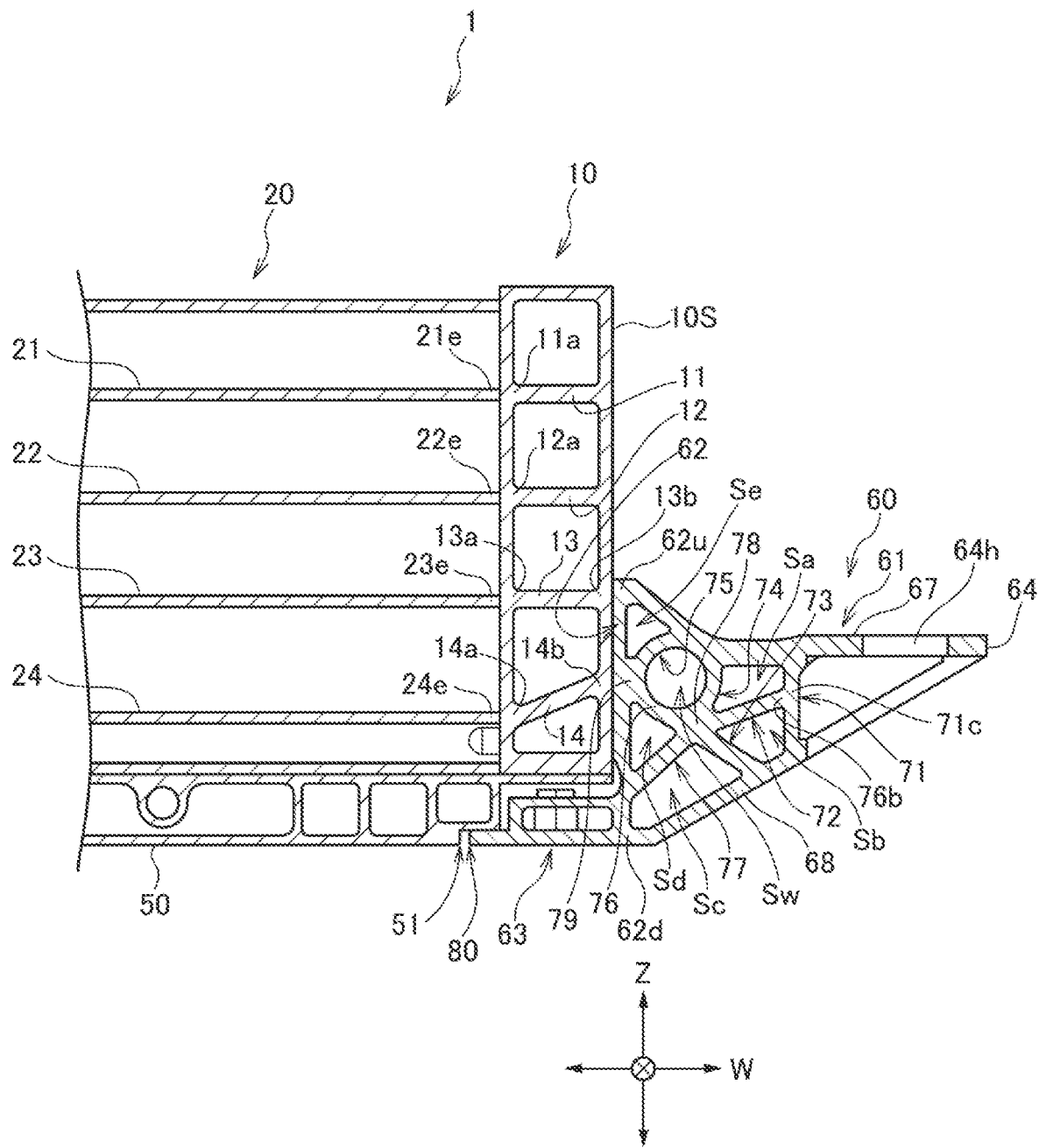
FIG. 5 is a cross-sectional view illustrating a battery case according to a second embodiment of the present invention by cutting out the battery case at the same position as the battery case according to the first embodiment shown in FIG. 3.

FIG. 5 is a cross-sectional view illustrating the battery case 1 according to a second embodiment of the present invention by cutting out the battery case 1 at the same position as the battery case 1 according to the first embodiment shown in FIG. 3.

The battery case 1 shown as the second embodiment is different from the battery case 1 shown as the first embodiment in the structure of the side bracket 60. In the battery case 1, components having the same functions as those described in the battery case 1 are denoted by the same reference signs, and detailed description thereof will be omitted.

Figure 6:
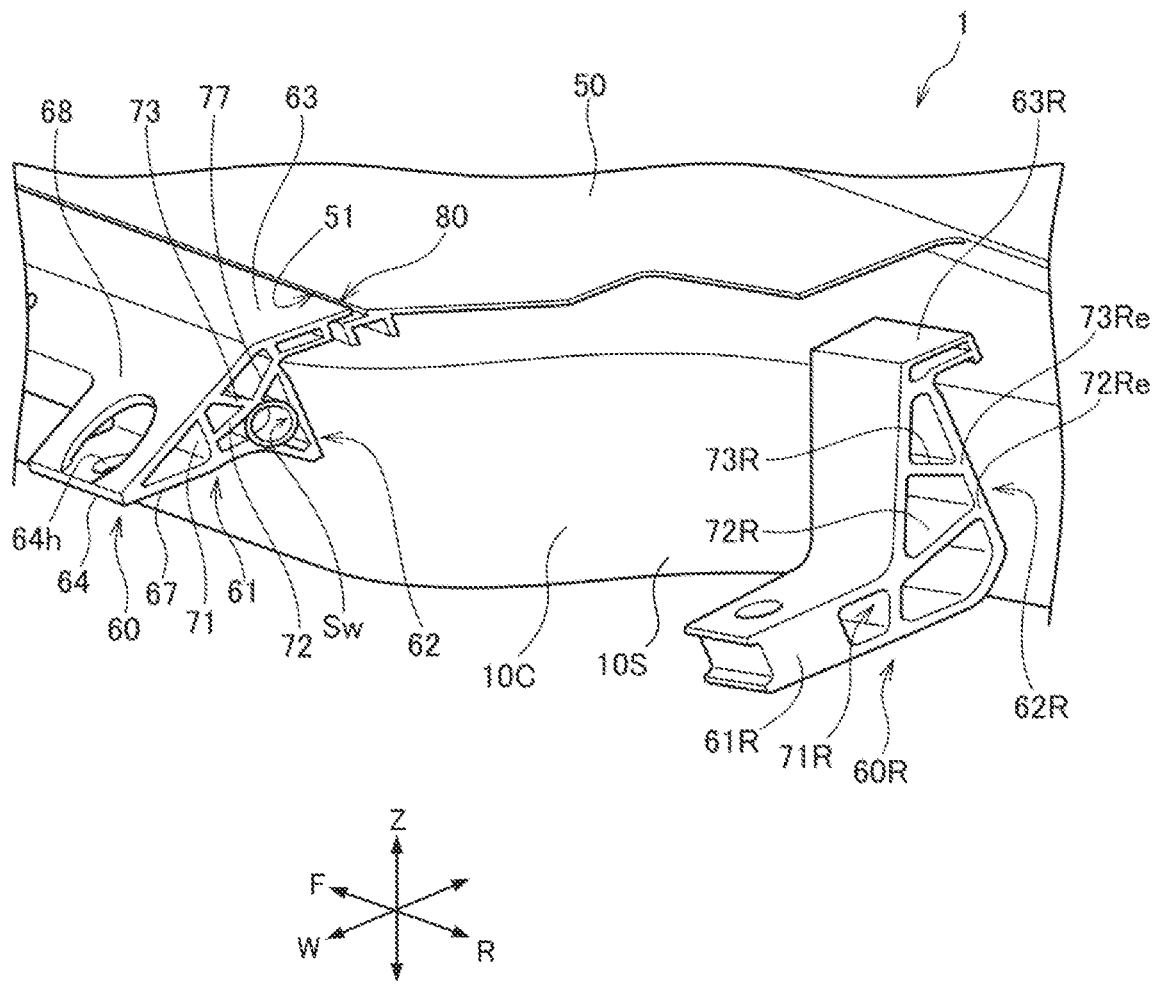
FIG. 6 is a perspective view of a main part of the battery case in FIG. 5 as viewed from a bottom side of a vehicle.

FIG. 6 is a perspective view of a main part of the battery case 1 in FIG. 5 as viewed from a bottom side of the vehicle 100. As shown in FIG. 6, a step portion 51 is formed on a lower surface of the bottom plate 50 constituting a bottom portion of the battery case 1 along the front-rear direction FR of the vehicle 100.

A lower end surface of the support portion 63 is formed in a manner of protruding to one side, and the support portion 63 includes a facing portion 80 facing the step portion 51 located on a vehicle outer side in the width direction W.

In the battery case 1 according to the second embodiment, a flat structure is formed in which the step portion 51 and the facing portion 80 are disposed in a manner of butting each other, and the lower surface of the support portion 63 of the main body portion 61 and the lower surface of the bottom plate 50 forming the bottom portion of the battery case 1 are flat in the vehicle upper-lower direction Z.

Therefore, in the battery case 1, when an excessive load is input, a load path is formed that connects the facing portion 80 of the side bracket 60 to the step portion 51 of the bottom plate 50.

In the second embodiment, the side bracket 60 includes a first rib 71, a second rib 72, a third rib 73, a fourth rib 74, a fifth rib 75, a sixth rib 76, and a seventh rib 77 extending in the width direction W or the upper-lower direction Z inside the side bracket 60.

One end of the first rib 71 is connected to the main body upper surface portion 67, extends along the upper-lower direction Z, and the other end thereof is connected to the main body lower surface portion 68. Further, the first rib 71 extends in the front-rear direction FR. One end of the second rib 72 is connected to the vicinity of a central portion 71c of the first rib 71 in the upper-lower direction Z and extends in the width direction W and the front-rear direction FR. One end of the third rib 73 is connected to an inner side in the width direction W with respect to a connection portion between the main body lower surface portion 68 and the first rib 71, and extends in the width direction W and the front-rear direction FR. One end of the fourth rib 74 is connected to an inner side in the width direction W with respect to a connection portion between the main body upper surface portion 67 and the first rib 71, and extends in the upper-lower direction Z and the front-rear direction FR. The other end of the second rib 72, the other end of the third rib 73, and the other end of the fourth rib 74 are aggregated and connected in the vicinity of a center inside the side bracket 60, and form a first aggregated portion 78.

One end of the fifth rib 75 is connected to the main body upper surface portion 67 and extends in the width direction W and the front-rear direction FR. One end of the sixth rib 76 is connected to the first aggregated portion 78 and extends in the width direction W and the front-rear direction FR. The other end of the fifth rib 75 and the other end of the sixth rib 76 are aggregated and connected in the abutting portion 62 to form a second aggregated portion 79. The seventh rib 77 extends from the first aggregated portion 78 in a direction different from the sixth rib 76 in the width direction W and is connected to the abutting portion 62.

In the second embodiment, by providing these ribs, strength of the side bracket 60 in the vehicle width direction W and the upper-lower direction Z is increased.

In the second embodiment, the following load paths are formed in the side bracket 60 as examples. That is, a first load path is formed through which a load input from the protruding end portion 64 is transmitted to the side frame 10 through the main body upper surface portion 67, the first rib 71, the second rib 72, and the seventh rib 77. Further, a second load path is formed through which the load input from the protruding end portion 64 is transmitted to the side frame 10 through the main body lower surface portion 68, the third rib 73, the first aggregated portion 78, the sixth rib 76, and the second aggregated portion 79. Further, a second load path is formed through which the load input from the protruding end portion 64 is transmitted to the side frame 10 through the main body upper surface portion 67, the fourth rib 74, the first aggregated portion 78, and the sixth rib 76. Further, a third load path is formed through which the load input from the protruding end portion 64 is transmitted to the side frame 10 from the main body upper surface portion 67, the fifth rib 75, and the second aggregated portion 79. Furthermore, a fourth load path is formed through which the load input from the protruding end portion 64 is transmitted to the bottom plate 50 through the main body upper surface portion 67, the fourth rib 74, the first aggregated portion 78, the seventh rib 77, and the support portion 63.

The fourth rib 74, the fifth rib 75, and the sixth rib 56 are formed such that a cross-sectional shape in the upper-lower direction Z along the width direction W is circular. That is, a cylindrical passage Sw extending in the front-rear direction FR is formed by the fourth rib 74, the fifth rib 75, and the sixth rib 56 in the side bracket 60. The cylindrical passage Sw is a passage for conveying a refrigerant that cools an in-vehicle device provided in the vehicle 100.

Since the side bracket 60 includes the first rib 71 to the seventh rib 77 described above, an inside of the side bracket 60 is partitioned into the cylindrical passage Sw and spaces Sa, Sb, Sc, Sd, Se in a cross section in the upper-lower direction Z along the width direction W.

When the excessive load is input to the side bracket 60, the spaces Sa, Sb, Sc, Sd, and Se are crushed by deformation or breakage of the first rib 71 to the fifth rib 75. That is, the spaces Sa, Sb, Sc, Sd, and Se function as a buffer structure that absorbs the load transmitted to the side frame 10.

Next, the rear side bracket 60R will be described.

The rear side bracket 60R includes a main body portion 61R that attaching the battery case 1 to the vehicle body, an abutting portion 62R that constitutes one surface of the main body portion 61R on a side frame 10 side and abuts against the outer surface 10S of the side frame 10, and a support portion 63R that protrudes from a lower end of the abutting portion 62R and supports the battery case 1 from a lower side.

A first rib 71R, a second rib 72R, and a third rib 73R are provided inside the rear side bracket 60R.

The first rib 71R extends in the front-rear direction FR along the upper-lower direction Z. Further, the second rib 72R and the third rib 73R are disposed in a manner of partitioning an inside of the rear side bracket 60R in the upper-lower direction Z.

Although not shown in FIG. 6, the rear side bracket 60R is also disposed such that end portions 72Re and 73Re respectively provided in the second rib 72R and the third rib 73R, which extend in the width direction W, on the side frame 10 side correspond to end portions of the frame ribs 11, 12, 13, and 14 provided inside the side frame 10 on a rear side bracket 60R side.

Accordingly, similarly to the side bracket 60, a load path is formed through which a load input to the rear side bracket 60R is transmitted to the side frame 10.

Effects of Second Embodiment

First, effects of the rear side bracket 60R which is also provided in the battery case 1 according to the first embodiment will be described. The rear side bracket 60R includes the second rib 72R and the third rib 73R extending in the vehicle width direction W inside the rear side bracket 60R. Accordingly, the rear side bracket 60R is supported in the vehicle width direction W by the second rib 72R and the third rib 73R inside the rear side bracket 60R. Therefore, strength of the rear side bracket 60R in the vehicle width direction W is increased.

In the vehicle upper-lower direction Z, the second rib 72R and the third rib 73R of the rear side bracket 60R are disposed such that height positions of the end portions 72Re and 73Re thereof on the side frame 10 side are aligned with height positions of the end portions of the frame ribs 11, 12, 13, and 14, which are disposed inside the side frame 10, on the rear side bracket 60R side.

Therefore, in the battery case 1, the load path passes from the second rib 72R and the third rib 73R of the rear side bracket 60R to the frame ribs 11, 12, 13, and 14 is formed. Therefore, the load input to the rear side bracket 60R from the outer side in the vehicle width direction W can be more reliably dispersed to the side frame 10.

Further, in the vehicle upper-lower direction Z, the height positions of the end portion 72Re of the second rib 72R and the end portion 73Re of the third rib 73R of the rear side bracket 60R on the side frame 10 side are aligned with the height positions of the end portions of the frame ribs 11, 12, 13, and 14, which are disposed inside the side frame 10, on the rear side bracket 60R side, and thus even on the rear side of the vehicle 100, rigidity of the battery case 1 in the vehicle width direction W is increased, and the load input from a side of the vehicle 100 can be smoothly transmitted in the vehicle width direction W of the battery case 1.

In the second embodiment, the first rib 71, the second rib 72, the third rib 73, the fourth rib 74, the fifth rib 75, the sixth rib 76, and the seventh rib 77 extending in the width direction W or the upper-lower direction Z are formed inside the side bracket 60. This further increases the strength of the side bracket 60 in the vehicle width direction W and the upper-lower direction Z.

In the second embodiment, by providing the first rib 71 to the seventh rib 77, a load path such as the first load path to the fourth load path is formed in the side bracket 60 as an example. Therefore, the load input from the protruding end portion 64 of the side bracket 60 can be more reliably dispersed to the side frame 10.

In the upper-lower direction Z, a height position of the second aggregated portion 79 in the side bracket 60 is aligned with a height position of the end portion 14b on the side bracket 60 side of the frame rib 14 in the side frame 10. The load path formed in this manner can smoothly transmit the load input from the side of the vehicle 100 in the vehicle width direction W of the battery case 1.

In the battery case 1 according to the second embodiment, the spaces Sa, Sb, Sc, Sd, and Se that function as the buffer structure are formed inside the side bracket 60 by the first rib 71 to the seventh rib 77 provided therein. In such a structure, when the excessive load is input to the side bracket 60, the spaces Sa, Sb, Sc, Sd, and Se are crushed, so that the excessive load input from the side of the vehicle 100 can be absorbed. Therefore, it is possible to prevent the excessive load from being transmitted to the side frame 10.

In the second embodiment, the cylindrical passage Sw having a cylindrical shape is formed inside the side bracket 60. When the passage has such a cylindrical shape, a stress is unlikely to concentrate, and strength of the passage is increased. Furthermore, it also contributes to strength improvement of the side bracket 60 as a whole.

As described above, according to the battery case 1 described above, the durability against the load input to the side surface of the vehicle 100 can be improved, and an accommodated battery can be more reliably protected.

Other Embodiments

Although the embodiments of the present invention have been described above, the above embodiments are merely a part of application examples of the present invention, and are not intended to limit the technical scope of the present invention to the specific configurations of the above embodiments. Various changes and modifications may be made to the above embodiments within the scope of the matters described in the claims.

The curved portion 10C formed in the side frame 10 is not limited to one position. A position thereof can be appropriately changed according to a design of the battery case 1. Curved portions may be formed at a plurality of positions of the side frame 10.

The cross-sectional shapes of the side frame 10 and the cross member 20 are not limited to the shapes shown in FIGS. 4 and 6.

A position of the cylindrical passage Sw in the side bracket 60 is not limited to the position shown in FIG. 6. Further, any one of the spaces Sa, Sb, Sc, Sd, and Se formed by partitioning the inside of the side bracket 60 by the first rib 71—the seventh rib 77 may be used as the refrigerant passage.

In the second embodiment, the load paths formed in the side bracket 60 by providing the first rib 71 to the seventh rib 77 is not limited to the first load path to the fourth load path described above.

The invention claimed is:

1. A battery case that accommodates a battery for an electric vehicle, the battery case comprising:
   a pair of side frames that constitute left and right side walls of the battery case in a vehicle width direction and extend along a vehicle front-rear direction;
   a cross member that partitions an internal space of the battery case in the vehicle front-rear direction and extends from one of the side frames to another of the side frames; and
   a side bracket that is fixed to an outer surface of a side frame and configured to attach the battery case to a vehicle body, wherein
   the side frame includes a frame rib extending in the vehicle width direction inside the side frame,
   the side bracket includes a bracket rib extending in the vehicle width direction inside the side bracket,
   the cross member includes a member rib extending in the vehicle width direction inside the cross member, and
   an end portion of the frame rib on a cross member side and an end portion of the member rib on a side frame side are disposed in a manner of corresponding to each other in a vehicle upper-lower direction.

2. The battery case according to claim 1, wherein an end portion of the bracket rib on the side frame side and an end portion of the frame rib on a side bracket side are disposed in a manner of corresponding to each other in the vehicle upper-lower direction.

3. The battery case according to claim 1, wherein the side bracket includes an abutting portion that abuts against the outer surface of the side frame and a support portion that supports a bottom portion of the battery case from below.

4. The battery case according to claim 3, wherein
- a plurality of frame ribs are provided at predetermined intervals in the vehicle upper-lower direction, and
- an upper end of the abutting portion and an end portion of one of the frame ribs on a side bracket side are disposed in a manner of corresponding to each other in the vehicle upper-lower direction.

5. The battery case according to claim 3, wherein a lower surface of the support portion and a lower surface of the bottom portion of the battery case are disposed in a manner of corresponding to each other in the vehicle upper-lower direction.

6. The battery case according to claim 1, wherein
- the side bracket has a passage extending in the vehicle front-rear direction by partitioning an inside of the side bracket by the bracket rib, and
- the passage is a refrigerant passage for cooling an in-vehicle device provided in the electric vehicle.

7. The battery case according to claim 1, wherein the pair of side frames are curved such that a distance between the pair of side frames in the vehicle width direction gradually decreases along the vehicle front-rear direction.

* * * * *